N. SPENARD.

LOOM SHUTTLE.

APPLICATION FILED OCT. 11, 1918.

Reissued Apr. 12, 1921. 15,087.

Inventor

Napoleon Spenard

By Watson E. Coleman

Attorney

UNITED STATES PATENT OFFICE.

NAPOLEON SPENARD, OF BIDDEFORD, MAINE, ASSIGNOR OF ONE-HALF TO ERNEST L. MORRILL, OF BIDDEFORD, MAINE.

LOOM-SHUTTLE.

15,087. Specification of Reissued Letters Patent. Reissued Apr. 12, 1921.

Original No. 1,242,383, dated October 9, 1917, Serial No. 150,782, filed February 24, 1917. Application for reissue filed October 11, 1918. Serial No. 257,797.

*To all whom it may concern:*

Be it known that I, NAPOLEON SPENARD, a citizen of the United States, residing at Biddeford, in the county of York and State of Maine, have invented certain new and useful Improvements in Loom-Shuttles, of which the following is a specification, reference being had to the accompanying drawings.

This invention relates to improvements in loom shuttles, and has for its primary object to provide an improved guide for the weft thread to hold the same in proper position and prevent the thread from being accidentally displaced from the threading device arranged in the weft chamber of the shuttle.

It is another object of my invention to provide a guide-eye for the thread which is of such construction as to effectually obviate the breaking of the thread, thus avoiding the necessity of frequently stopping the operation of the loom.

A further object of the invention is to provide a guide-eye so constructed that in case the thread or filling loops around the shank of the eye that said loop shall very quickly run off the shank before the tension on the thread has caused the thread to break.

With the above and other objects in view, my invention consists in the novel features of construction, combination and arrangement of parts to be hereinafter more fully described, claimed and illustrated in the accompanying drawing, in which:—

Figure 1:
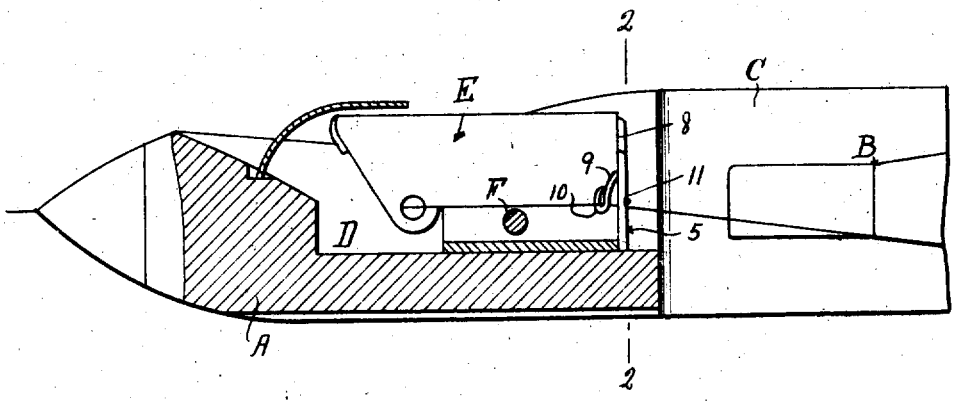
Figure 1 is a longitudinal section of a well known type of loom shuttle showing my improved guide-eye arranged in operative relation with the threading device in the weft chamber.
Figure 2:
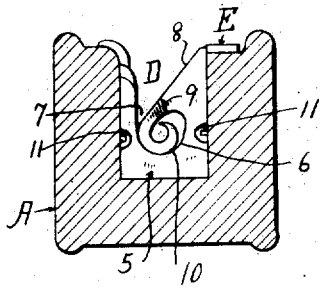
Fig. 2 is a section taken on the line 2—2 of Fig. 1.

Referring in detail to the drawing, A indicates the shuttle and B the bobbin which is located in the weft chamber C. With this chamber, the threading channel D in the nose of the shuttle, communicates. Within this channel, a metal threading device of a well known construction, as indicated at E, is arranged and secured by means of the transverse bolt F. The device E is provided with the usual thread receiving throat or channel. It will be understood that the several parts just referred to are well known in the art and constitute no part of the present invention.

Figure 3:
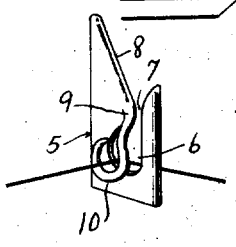
Fig. 3 is an enlarged perspective view of the eye.

My invention illustrated in detail in Fig. 3 of the drawing, is adapted to be arranged at the inner end of the threading channel D and between the side walls of the metal threading device E. The eye is formed from a metal plate 5, which is stamped out or cut to provide the substantially circular opening 6 therein with which the lower, relatively narrow end of an entrance throat 7 communicates at one side of said opening. One edge of this entrance throat is obliquely inclined, as shown at 8, and from the lower end of this inclined edge, an integral part of the metal plate projects and is bent or inclined laterally from the plane of the plate, as shown at 9. The end of this arm or shank is formed with a coil 10 therein, the center of which coincides with the center of the opening 6 in the plate 5. The opposite edges of the plate 5 are notched or recessed, as shown at 11, to receive retaining lugs or projections on the side walls of the threading device E, whereby the eye plate is held in position against vertical or lateral shifting movement.

The thread or filling is drawn from the bobbin through the channel D and the threading device arranged therein in the usual manner, the thread being inserted downwardly between the retaining wings or flanges of the threading device and directed by the inclined edge 8 of the eye plate into the opening 6 thereof. The thread is again brought upwardly against the edge of this opening and into contact with the laterally bent or inclined extension 9 which directs the thread into the eye 10. The thread is thus supported by this eye and is freely movable therethrough as it is withdrawn from the bobbin in the operation of the machine. By providing the supporting or guide eye for the thread of the construction described, the tangling or breaking of the thread in the operation of the loom is prevented and the thread is at all times properly supported for free movement through the threading device and the side eye in the nose of the shuttle. It is unnecessary to make any changes whatever in the mounting or arrangement of the bobbin or the construction of the latter in order that the present invention may be adapted to the common construction of loom shuttles.

From the foregoing description, taken in connection with the accompanying drawing, the construction, manner of operation and several advantages of the device will be clearly and fully understood. The thread eye being formed from a single metal plate may obviously be manufactured at small cost and is also very durable in practical use. The eye may be readily arranged in position with relation to the threading device and may be used in connection with various constructions of such threading devices without necessitating any material alterations therein.

There are two features in the construction of the eye to which attention is particularly called. It will be seen that the metal from which the eye is formed extends downward transversely to the longitudinal axis of the shuttle, as at 8, so as to form a downwardly extending guiding edge for the thread and that the shank 9 forms a continuation of this portion 8 and merges thereinto, and that then the shank is formed to provide a helical coil which extends inward in the direction of the path of travel of the thread toward the exit end of the thread channel and that that portion of the coil adjacent its extremity tapers more or less uniformly to the extremity of the coil, which extremity is disposed in advance of the main body of the coil. Now if the thread becomes looped around this shank and the shank was of uniform diameter, the loop would tend to remain around the shank and the friction induced by this loop of thread around the shank would tend to act to break the thread and, as a matter of fact, the thread would break very quickly as the filling or thread is extremely light and has but little strength. By making the shank tapering toward the extremity of the coil, however, the natural tendency of the loop is to work off of this tapering portion of the shank or work toward the point and off of the point, and inasmuch as the pointed extremity of the shank is disposed in advance of the body of the coil, it follows that the natural movement of the thread will tend to pull the loop of thread toward the point of the coil and off of this point so that there are two forces acting to pull the loop off the coil, namely the tendency of the loop to slip off the tapered polished shank and the fact that the natural pull of the thread tends to pull the loop toward the pointed end of the shank. It will, of course, be understood that the eye can be made in various sizes as may be required in accordance with the particular type of construction of the shuttle. Therefore, while I have shown and described the preferred form and arrangement of the several parts of the device, the same is susceptible of considerable modification therein and I reserve the privilege of adopting all such legitimate changes as may be fairly embodied within the spirit and scope of the invention as claimed.

Having thus fully described my invention, what I desire to claim and secure by Letters Patent is:

1. A throat guide for loom shuttles consisting of a flat metal plate having an opening therein and an entrance throat communicating with said opening, said plate having an extension formed integrally therewith at one side of the entrance throat, said extension being of circular form in cross section and bent to provide a single thread receiving coil therein terminating on an imaginary line extending through the opening in spaced relation to the edge thereof.

2. A throat guide for loom shuttles consisting of a flat metal plate having an opening therein and an entrance throat communicating with said opening, an extension integrally formed with the plate at one side of said entrance throat and sharply offset in a lateral direction from one side of the plate, said extension being formed into a single thread receiving coil disposed in substantially parallel relation to the plane of the plate.

3. A throat guide for loom shuttles consisting of a flat metal plate having an opening therein and an entrance throat communicating with said opening, said plate being further provided with a laterally offset, thread receiving eye disposed in spaced relation to said opening and in substantially parallel relation to the plane of the plate.

4. As an improved article of manufacture, a throat guide for loom shuttles consisting of a flat metal plate having an opening therein and an entrance throat communicating with said opening, one edge of the entrance throat being obliquely inclined, and an extension integrally formed with the plate and projecting laterally from the inner end of said inclined edge of the throat, said extension being formed into a single thread receiving eye disposed in spaced relation to said opening.

5. In a shuttle having a thread receiving channel, a thread guide at one end of the channel comprising a metallic member extending transversely from one side wall of the channel downward and toward the other side wall, the metallic member being formed to provide a shank circular in cross section, the lower portion of the shank being bent toward the first named side wall and beneath the shank and being formed to provide a single helical coil extending toward the exit end of the channel, the axis of the coil being approximately central to the longitudinal axis of the channel, the extremity of the coil terminating short of a point in longitudinal alinement with the beginning of the coil, the terminal portion of the coil gradually decreasing in diameter to its extremity.

In testimony whereof I hereunto affix my signature in the presence of two witnesses.

NAPOLEON SPENARD.

Witnesses:
MILTON O. DEAN,
CLARENCE GORE.